(12) United States Patent
Kang et al.

(10) Patent No.: US 9,110,745 B2
(45) Date of Patent: Aug. 18, 2015

(54) SYSTEM AND METHOD FOR FLOW CONTROL IN A MESSAGING SUBSYSTEM BASED ON MESSAGE-IN/OUT RATES

(75) Inventors: Amy H. Kang, Mountain View, CA (US); Edward J. Bratt, Oakland, CA (US)

(73) Assignee: ORACLE INTERNATIONAL CORPORATION, Redwood Shores, CA (US)

(*) Notice: Subject to any disclaimer, the term of this patent is extended or adjusted under 35 U.S.C. 154(b) by 501 days.

(21) Appl. No.: 13/163,355

(22) Filed: Jun. 17, 2011

(65) Prior Publication Data

US 2012/0324000 A1 Dec. 20, 2012

(51) Int. Cl.
*G06F 15/16* (2006.01)
*G06F 9/54* (2006.01)
*G06F 15/173* (2006.01)

(52) U.S. Cl.
CPC ..................... *G06F 9/546* (2013.01)

(58) Field of Classification Search
CPC .................................................. G06F 9/546
USPC ........................................................ 709/204
See application file for complete search history.

(56) References Cited

U.S. PATENT DOCUMENTS

| | | | |
|---|---|---|---|
| 6,192,029 B1 | 2/2001 | Averbuch | |
| 6,604,145 B1 | 8/2003 | Bell | |
| 6,789,050 B1 | 9/2004 | Reeser | |
| 7,293,145 B1 * | 11/2007 | Baird et al. | 711/162 |
| 7,756,910 B2 * | 7/2010 | Chow et al. | 707/813 |
| 2006/0256786 A1 | 11/2006 | Bibr | |
| 2007/0244987 A1 * | 10/2007 | Pedersen et al. | 709/217 |
| 2008/0059663 A1 * | 3/2008 | Barry et al. | 710/33 |
| 2009/0279482 A1 | 11/2009 | Tinnakornsrisuphap | |
| 2010/0115059 A1 | 5/2010 | Youill | |
| 2010/0306365 A1 | 12/2010 | Gale | |

FOREIGN PATENT DOCUMENTS

| | | |
|---|---|---|
| EP | 1376952 | 5/2008 |
| JP | 7013909 | 1/1995 |
| WO | WO 2010101650 | 9/2010 |

OTHER PUBLICATIONS

"Administration Console Online Help", 18 pages.

(Continued)

*Primary Examiner* — Joseph Greene
(74) *Attorney, Agent, or Firm* — Tucker Ellis LLP (57) ABSTRACT

Systems and methods are provided, for use in a messaging subsystem, which supports flow control of messages between producers and consumers. A system can include at least one producer that is operable to send messages in a batch to one or more consumers via at least one destination; and one or more consumers that are operable to process messages received from the at least one producer via the at least one destination. The system can also include a message broker which includes the at least one destination and which manages communications between the at least one producer and the one or more consumers. The message broker includes a flow controller that is operable to monitor a producing rate and a consuming rate, and dynamically adjust a batch size of the batch at the at least one producer based on the producing rate and the consuming rate to communicate the messages more efficiently.

20 Claims, 7 Drawing Sheets

(56) References Cited

OTHER PUBLICATIONS

"Sun Java System Message Queue 3.7 UR1 Administration Guide", 5 pages.

Pietzuch, et al., "Congestion Control in a Reliable Scalable Message-Oriented Middleware", IFIP International Federation of Information Processing, 2003, 20 pages.

* cited by examiner

```
        public void resumeFlow(int size) {
           int batchSize = size;
           float pc = getCurrentMessagePercentage();
           if (pc >= CHECK_MSGS_RATE_AT_DEST_CAPACITY_RATIO) {
              boolean sampleOnly = false;
              MetricData holder = null;
              synchronized(lastDestMetrics) {
                 DestinationUID did = getDestinationUID()
                 holder = lastDestMetrics.get(did);
                 if (holder == null) {
                    holder = new MetricData();
                    lastDestMetrics.put(did, holder);
                    sampleOnly = true;
                 }
              }
502           float ret = getMsgOutRateInRateRatio(holder, sampleOnly);
504           if (ret > 0 && ret < 1) {
506              batchSize = batchSize*ret;
                 if (batchSize < 1) {
                    batchSize = 1;
                 }
              }
              else if (ret > 1) {
508              batchSize = batchSize*ret;
                 if (batchSize > MAX_BATCH_SIZE) {
                    batchSize = MAX_BATCH_SIZE;
                 }
              }
           }
           sendResumeFlow(batchSize);
        }
```

```
        private  float   getMsgOutRateInRateRatio(MetricData  holder,  boolean
    sampleOnly) {
        if (sampleOnly) {
            synchronized(this) {
602             holder.msgin = msgsIn;
604             holder.msgOut = msgsOut;
            }
            holder.timestamp = System.currentTimeMillis();
            holder.ratein = -1;
            holder.rateout = -1;
            return -1;
        }
        long lastin = holder.msgin;
        long lastout = holder.msgout;
        long lastts = holder.timestamp;
        long lastinr = holder.ratein;
        long lastoutr = holder.rateout;
        long currtime = System.currentTimeMillis();
606     if ((currtime - lastts) < MIN_INTERVAL) {
            if (lastinr <= 0 || lastoutr < 0) {
                return -1;
            }
            return (lastoutr/lastinr);
        } holder.timestamp = currtime;
        synchronized(this) {
            holder.msgin = msgsIn;
            holder.msgout = msgsOut;
608         if (msgsInOutLastResetTime >= lastts) {
                return -1;
            }
        }
        long mt = holder.timestamp - lastts;
        long st = mt/1000L;
        if (st <= 0) {
            return -1;
        }
610     holder.ratein = (float)(holder.msgin - lastin)/st;
612     holder.rateout = (float)(holder.msgout - lastout)/st;
        if (holder.ratein =< 0 || holder.rateout < 0) {
            return -1;
        }
614     return (holder.rateout/holder.ratein);
    }
```

SYSTEM AND METHOD FOR FLOW CONTROL IN A MESSAGING SUBSYSTEM BASED ON MESSAGE-IN/OUT RATES

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF INVENTION

The present invention is generally related to computer systems and messaging subsystems such as Java Message System (JMS), and is particularly related to systems and methods for flow control in a message subsystem based on message-in/out rates.

BACKGROUND

Messaging subsystems can be provided as part of a middleware system to enable asynchronous messaging between clients and servers in the system. Typically, messaging subsystems, such as Java Message Service (JMS) generally include message producers, which produce and send messages to a particular destination at a broker, and message consumers, which receive and consume messages from those destinations. Generally, messages are received from a producer at a destination, where the messages are batched and forwarded to any consumers that are configured to receive messages from that destination.

SUMMARY

Systems and methods are provided, for use in a messaging subsystem, which supports flow control of messages between producers and consumers. One such system can include a computer, including a computer readable medium and processor. The system can further include at least one producer that is operable to send messages in a batch to one or more consumers via at least one destination; and one or more consumers that are operable to process messages received from the at least one producer via the at least one destination. The system can also include a message broker which includes the at least one destination and which manages communications between the at least one producer and the one or more consumers. The message broker includes a flow controller that is operable to monitor a producing rate and a consuming rate, and dynamically adjust a batch size of the batch at the at least one producer based on the producing rate and the consuming rate to communicate the messages more efficiently between the at least one producer and the one or more consumers.

DETAILED DESCRIPTION

In the following description, the invention will be illustrated by way of example and not by way of limitation in the figures of the accompanying drawings. References to various embodiments in this disclosure are not necessarily to the same embodiment, and such references mean at least one. While specific implementations are discussed, it is understood that this is done for illustrative purposes only. A person skilled in the relevant art will recognize that other components and configurations may be used without departing from the scope and spirit of the invention.

Furthermore, in certain instances, numerous specific details will be set forth to provide a thorough description of the invention. However, it will be apparent to those skilled in the art that the invention may be practiced without these specific details. In other instances, well-known features have not been described in as much detail so as not to obscure the invention.

In accordance with an embodiment, systems and methods are provided, for use in a messaging subsystem, which supports flow control of messages between producers and consumers. One such system can include a computer, including a computer readable medium and processor. The system can further include at least one producer that is operable to send messages in a batch to one or more consumers via at least one destination; and one or more consumers that are operable to process messages received from the at least one producer via the at least one destination. The system can also include a message broker which includes the at least one destination and which manages communications between the at least one producer and the one or more consumers. The message broker includes a flow controller that is operable to monitor a producing rate and a consuming rate, and dynamically adjust a batch size of the batch at the at least one producer based on the producing rate and the consuming rate to communicate the messages more efficiently between the at least one producer and the one or more consumers.

Figure 1:
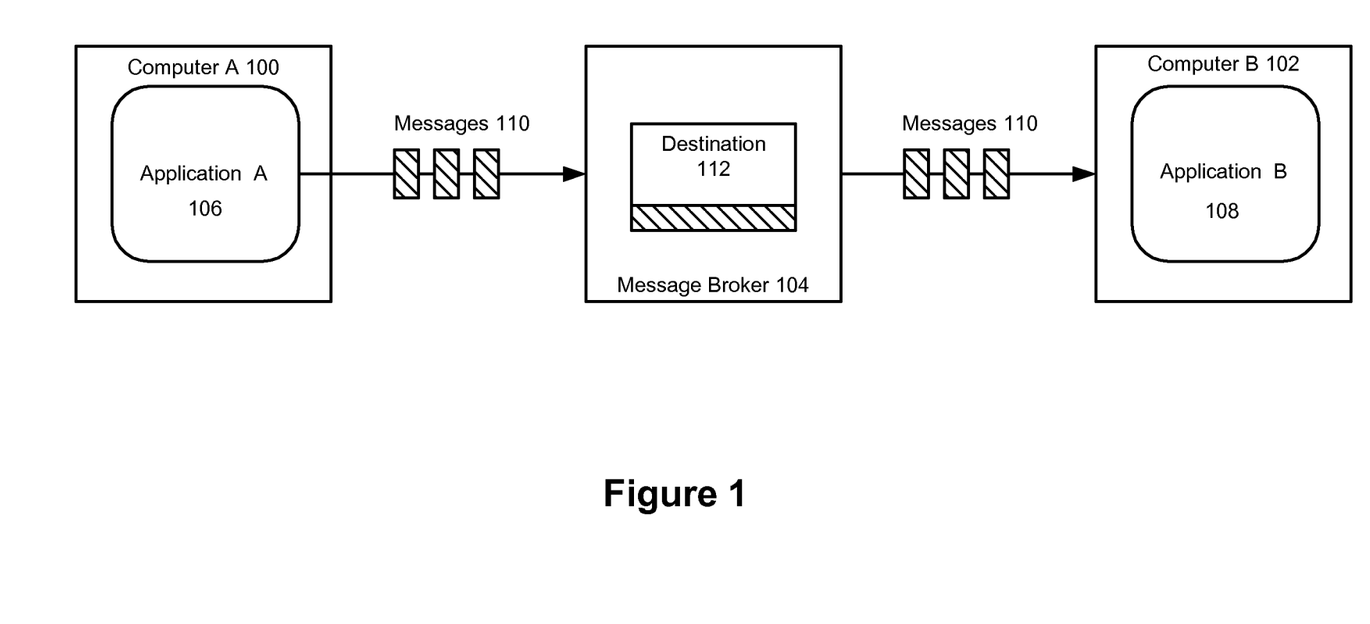
FIG. 1 shows a typical computing environment that includes a messaging subsystem.

FIG. 1 shows a typical computing environment that includes a messaging subsystem. As shown in FIG. 1, messages can be communicated from computer A 100 to computer B 102 via message broker (or message server) 104. In this example, application A 106 acts as a producer and application B 108 acts as a consumer. When application A produces messages 110, the messages can be communicated to a destination 112 at the message broker. Application B can be configured to consume the messages from the destination. Thus, applications A and B can communicate with one another indirectly through the message broker. Typically, the message broker can manage many destinations.

Producers and consumers often produce and consume messages at different rates. For example, if a producer produces messages more quickly than a consumer consumes those messages, then the destination can become overloaded with messages waiting to be consumed. To address this problem, and to communicate messages more efficiently between producers and consumers, systems have implemented flow control which stops the producer from producing additional messages until the current unconsumed messages are below a threshold.

In messaging subsystems, such as Java Message Service (JMS), the rate at which messages are produced is typically independent of the rate at which those messages are ultimately consumed. Generally, flow control can be provided by the message broker using a flow controller, and message production is typically based on a batch size and a system maximum limit. The flow controller can throttle the message producer, i.e., limit the production of messages, until the message consumer has consumed the messages below a threshold. A "resume flow" command can then be sent from the message broker which instructs the message producer to send another batch of messages, and the cycle repeats. However, typically the batch size is not dynamically adjusted based on how fast the producer and consumer are each producing or processing messages.

In accordance with an embodiment, the system can determine a producing rate and a consuming rate. As used herein, the producing rate refers to the rate at which messages are received at a message broker from a producer, and the consuming rate refers to the rate at which messages are consumed from the message broker by a consumer. Viewed from the perspective of the message broker, the producing rate corresponds to a message-in rate, and the consuming rate corresponds to a message-out rate. The system is configured to compare the producing rate and the consuming rate and, based on this comparison, either increase or decrease a message batch size at the producer. Thus, the flow controller can attempt to balance the producing and consuming rates which improves the efficiency of communications between the producers and consumers, and avoids excessive messages backing up at the broker.

Figure 2:
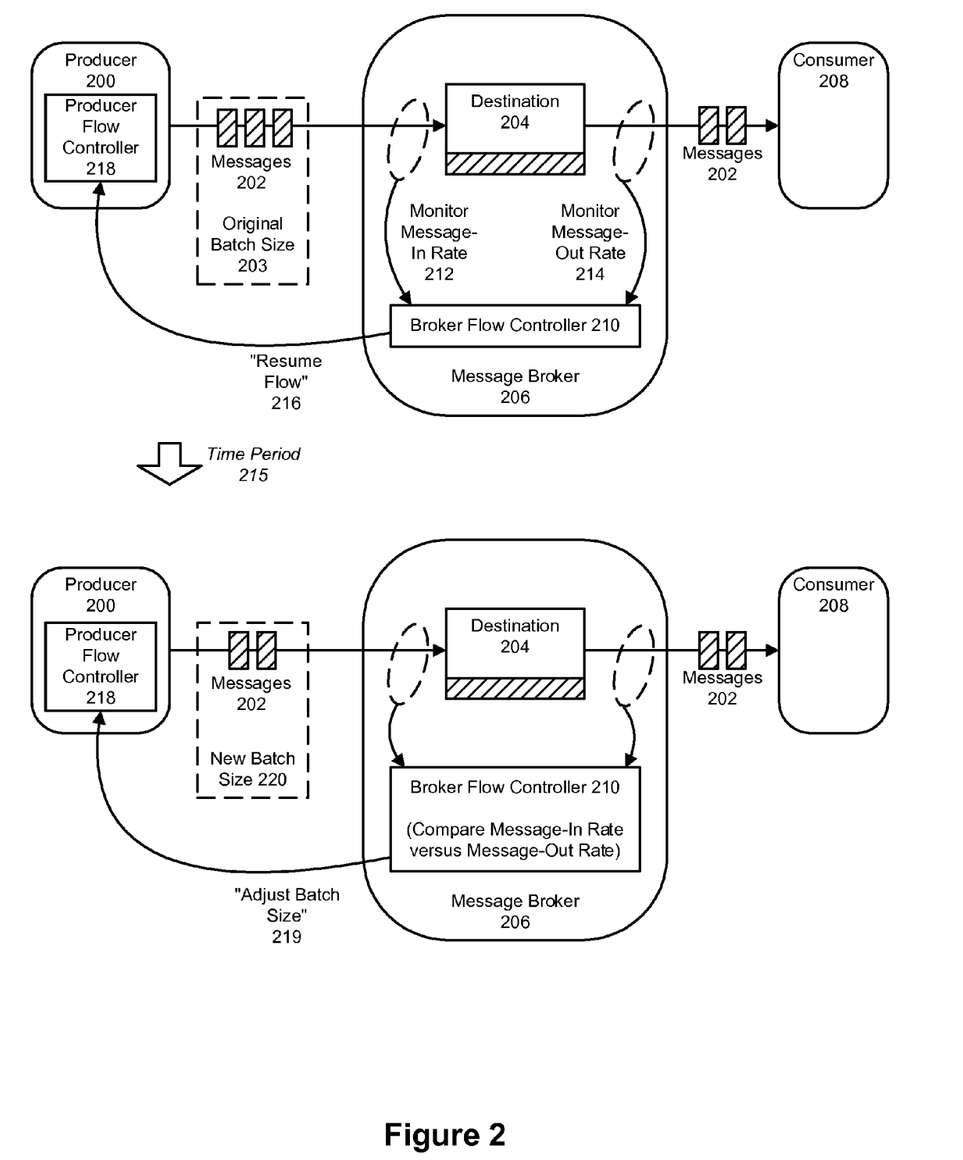
FIG. 2 shows a system that uses flow control in a messaging subsystem, in accordance with an embodiment.

FIG. 2 shows a system that uses flow control in a messaging subsystem, in accordance with an embodiment. Producer 200 sends messages 202 in a batch 203 to a destination 204 at message broker 206. Consumer 208 is configured to receive messages from the destination. A broker flow controller 210 monitors 212 the producing rate (i.e., message-in rate) as messages are received from the producer, and also monitors 214 the consuming rate (i.e., message-out rate) as messages are consumed by the consumer. When the message broker is ready to receive another batch of messages from the producer, the broker flow controller sends a resume flow 216 message to the producer flow controller 218.

In accordance with an embodiment, the broker flow controller is configured so that upon sending the resume flow message to the producer, the current producing and consuming rates are calculated and the message batch size is dynamically adjusted.

For example, if the producing rate is higher than the consuming rate, the producer can reduce the message batch size, by a percentage of the last batch size. Similarly, if the producing rate is lower than the consuming rate, the producer can increase the batch size, by a percentage of the last batch size.

As shown in FIG. 2, after a time period 215 has elapsed, the broker flow controller sends a resume flow message, which includes an instruction to adjust the batch size 219, to the producer flow controller. Thereafter, the producer sends messages to the destination according to a new batch size 220.

In accordance with an embodiment, calculation of the producing rates and consuming rates are triggered based on a number of unconsumed messages at the destination. If the number of unconsumed messages exceeds a threshold number, then the broker flow controller calculates the current producing and consuming rates.

The time period over which the producing and consuming rates is calculated can be preconfigured by an administrator, or can be configured to adapt dynamically depending on the rate at which the producing and consuming rates change. The producing and consuming rates can be calculated using an average rate over the time period, however any other method or methods of calculation of the rates over the time period are also possible.

Figure 3:
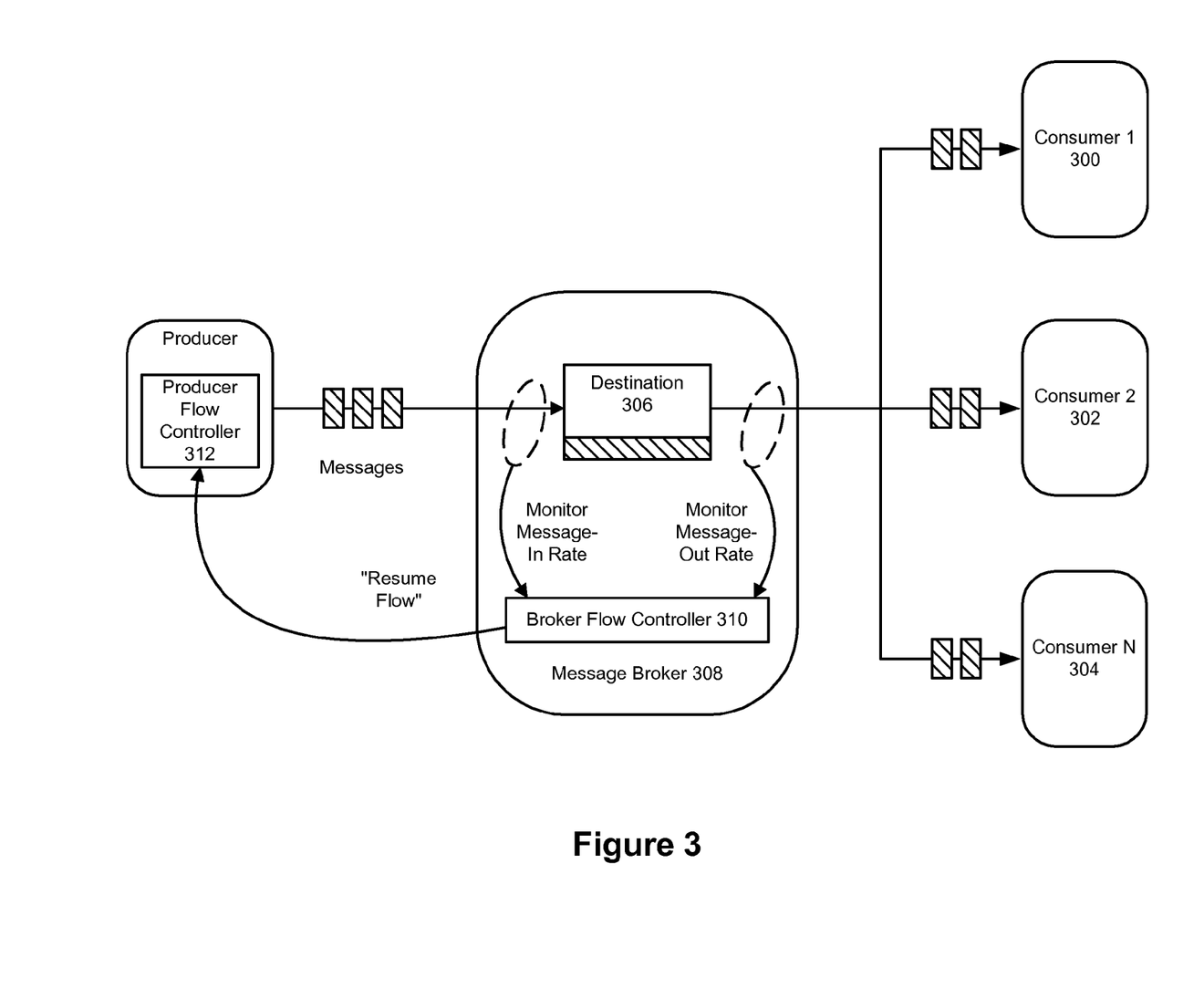
FIG. 3 shows a system that uses flow control in a messaging subsystem with multiple consumers, in accordance with an embodiment.

FIG. 3 shows a system that uses flow control in a messaging subsystem with multiple consumers, in accordance with an embodiment. As shown in FIG. 3, in accordance with an embodiment, multiple consumers 300-304 (here illustrated as consumers 1 through N) are configured to receive messages from destination 306, wherein each consumer can consume messages from the destination at a different rate. In aggregate, all of the consumers contribute to the consuming rate which, as described above, is calculated from the perspective of the message broker 308. Thus, the consuming rate (message-out rate) automatically incorporates the different consuming rates of individual consumers, and the batch size can be adjusted accordingly by broker flow controller 310 in communication with producer flow controller 312, regardless of the number of consumers configured to receive messages from a particular destination.

As noted above, the batch size can be dynamically adjusted at the producer when an instruction to resume flow is received at the producer from the message broker. In accordance with an embodiment, the batch size at the producer can be dynamically adjusted each time the instruction to resume flow is received at the producer.

Figure 4:
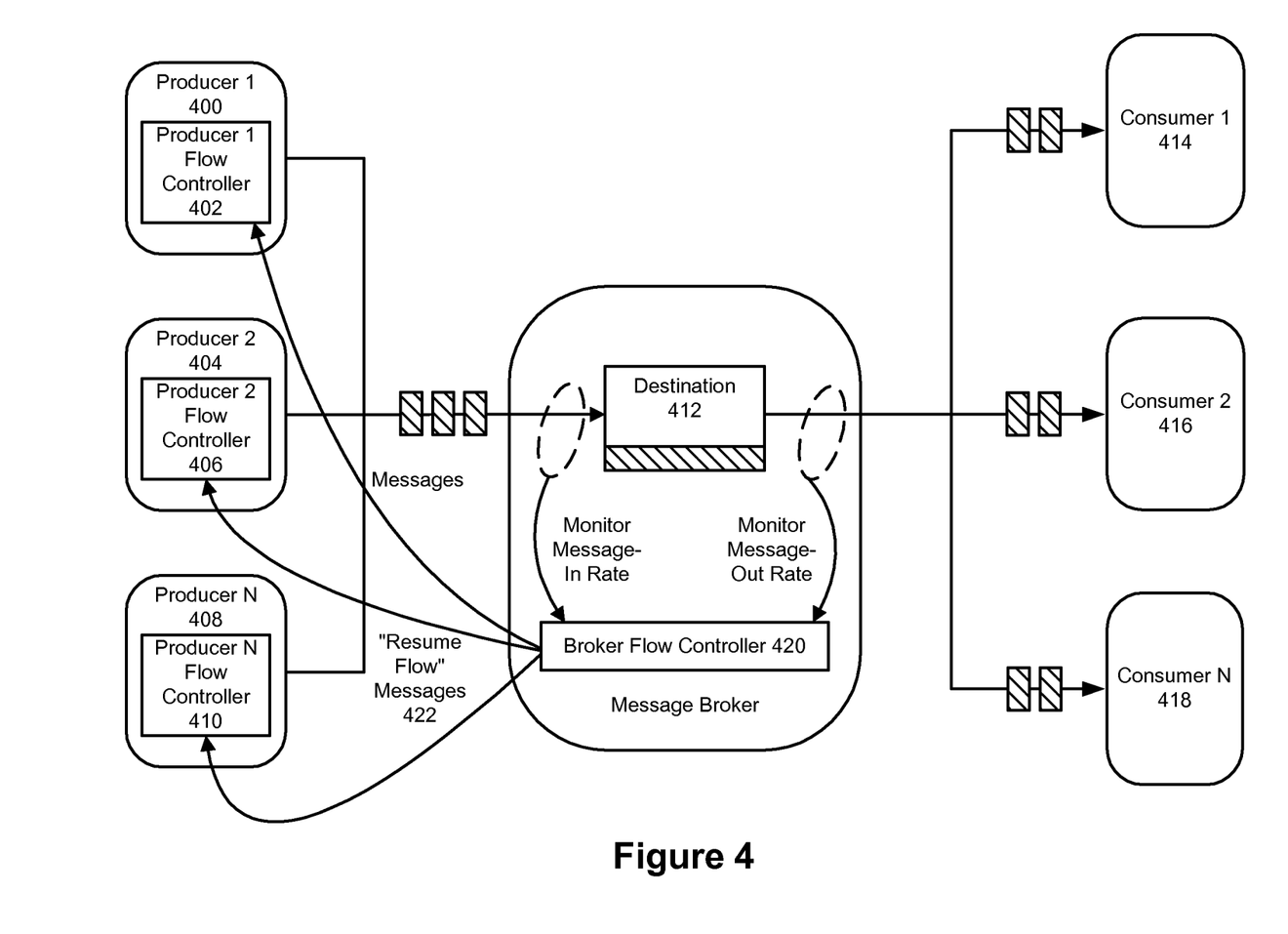
FIG. 4 shows a system that uses flow control in a messaging subsystem with multiple producers and one or more consumers, in accordance with an embodiment.

FIG. 4 shows a system that uses flow control in a messaging subsystem with a plurality of producers and one or more consumers, in accordance with an embodiment. Producers 1-N 400, 404 and 408, each having its own producer flow controller 402, 406 and 410, can each produce messages to destination 412 where they can be consumed by one or more consumers 414-418. The broker flow controller 420 monitors the message-in rate as messages are received from the plurality of producers. Although different producers are likely to produce messages at different rates, or in different batch sizes, because the producing rate (message-in rate) is calculated from the perspective of the message broker, the producing rate automatically incorporates the different producing rates of the one or more producers.

When the broker flow controller sends "resume flow" messages 422 to the plurality of producers, each resume flow message can include a new batch size for the particular producer to which the message is sent. The particular producer flow controller can then adjust the batch size accordingly, and resume producing messages according to the new batch size. This way, flow control can be implemented in systems having one or more producers and/or one or more consumers.

In accordance with an embodiment, a broker flow controller can provide flow control for a plurality of destinations at a message broker. The broker flow controller can monitor message-in and message-out rates at each of the plurality of destinations and adjust the batch size used by each producer which is producing messages to one or more of the plurality of destinations.

In accordance with an embodiment, the producing rate can be determined for the at least one destination based on how many messages have been produced by the at least one producer over a configurable time period; and the consuming rate can be determined for the at least one destination based on how many messages have been consumed by the one or more consumers over the configurable time period. In accordance with an embodiment, the flow controller can be further operable to dynamically adjust a batch size by calculating a ratio of the consuming rate to the producing rate; and dynamically adjusting the batch size, based on the calculated ratio, to a new batch size, so that subsequent messages from the particular message producer are sent according to the new batch size. Additionally, the new batch size can be determined by multiplying the batch size by the calculated ratio.

Figure 5:
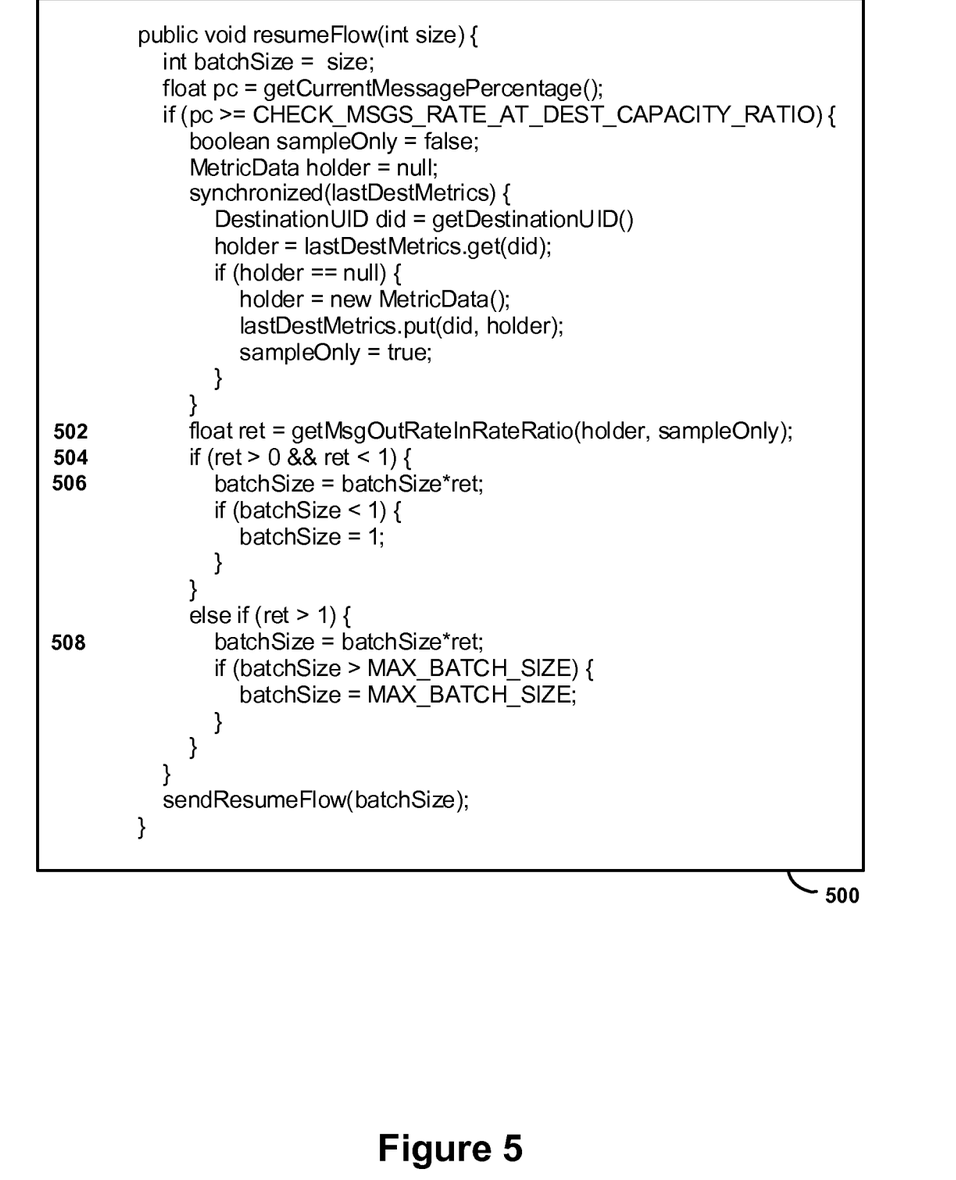
FIG. 5 shows a pseudocode listing of a method that can be used to dynamically adjust the batch size used by a producer, in accordance with an embodiment.

FIG. 5 shows a pseudocode listing of a method that can be used to dynamically adjust the batch size used by a producer, in accordance with an embodiment. In accordance with an embodiment, the message broker can call the "resumeFlow" method 500 shown in FIG. 5 when the producer has indicated that it has paused from producing messages. The producer can indicate this in the last message produced before the pause, for example by setting a resumeflow bit appropriately. This sample method can perform a simple batch size adjustment based on the ratio of the current consuming rate (message-out rate) to the current producing rate (message-in rate). It does this by calling another method (getMsgOutRateInRateRatio 502) which returns the current consuming rate to the current producing rate ratio. In this example, if the ratio of the current consuming rate to the current producing rate is greater than zero and less than one, as shown at 504, then that indicates that the current consuming rate is slower than the current producing rate. Accordingly, the batch size should be reduced. As shown at 506, the current batch size is reduced by the ratio of the current consuming rate to the current producing rate, with a minimum batch size of one. As shown at 508, when the ratio indicates that the producing rate is slower than the consuming rate, that is 'ret' is greater than one, the batch size will be increased accordingly, with a maximum batch size (MAX_BATCH_SIZE) used to limit the batch size to a predetermined value. Although FIG. 5 illustrates one method for adjusting batch size, other methods are equally applicable and the example shown in FIG. 5 is merely shown for purposes of explanation and is not intended to be limiting.

Figure 6:
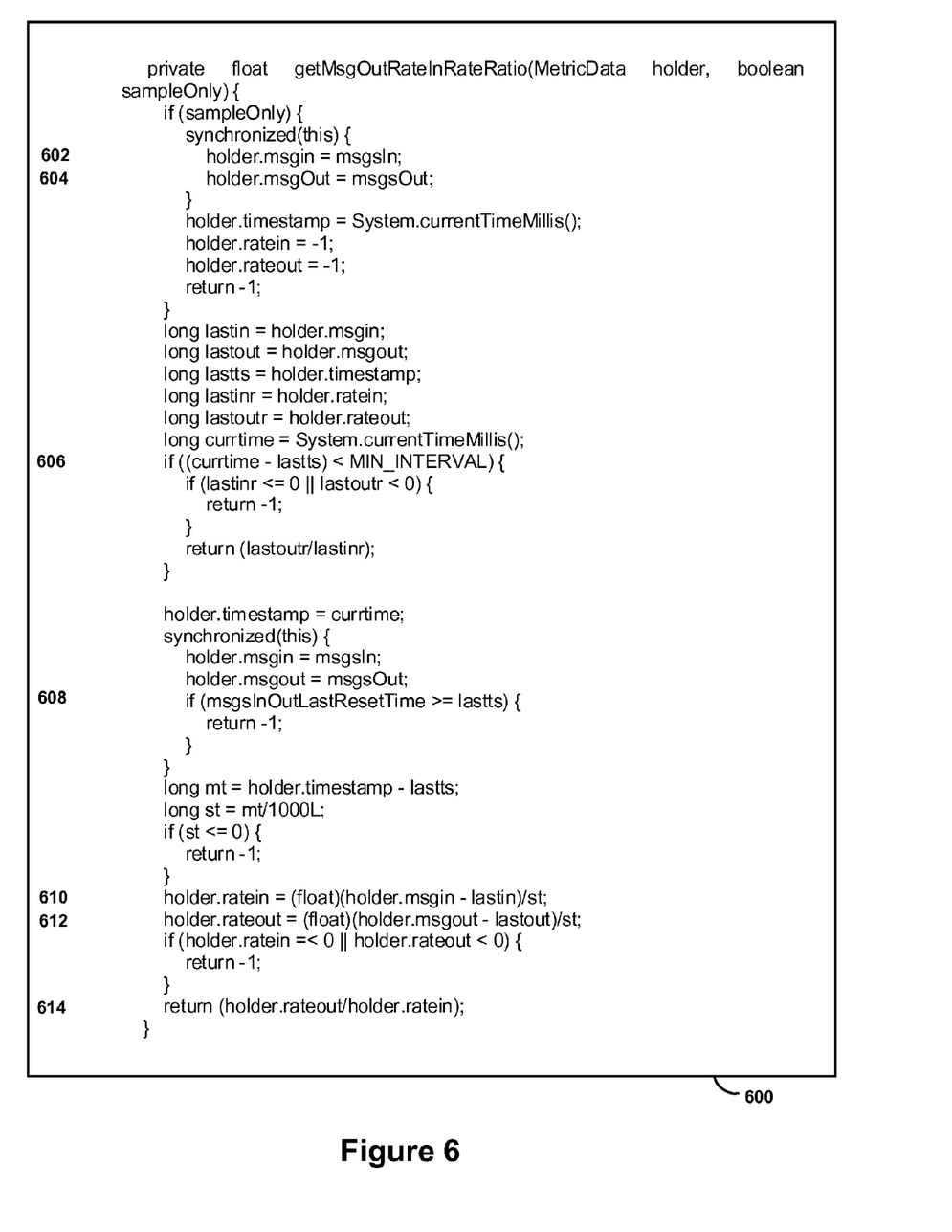
FIG. 6 shows a pseudocode listing of an method for calculating a ratio of the consuming rate to the producing rate, in accordance with an embodiment.

FIG. 6 shows a pseudocode listing of an method for calculating a ratio of the consuming rate to the producing rate, in accordance with an embodiment. A method such as the getMsgOutRateInRateRatio method 600 shown in FIG. 6, can be used as part of the method shown in FIG. 5. As shown in FIG. 6, and in accordance with an embodiment, counters (msgsIn 602 and msgsOut 604) are updated whenever a message is produced (in) and consumed (out). The period over which the producing and consuming rates are calculated can be controlled by resetting the counters. A minimum interval (MIN_INTERVAL 606) and a maximum interval can be set to ensure that the producing and consuming rates are calculated over an appropriate period of time. A timestamp (msgsInOutLastResetTime 608) can be used to track how long it has been since the counters were last reset, and to ensure that the period is calculated, and the intervals applied, appropriately. Once it has been determined that an appropriate time period has passed since the counters were last reset, the method can determine how many messages have come in and gone out during that time period, and then calculate the current producing rate 610 (holder.ratein) and consuming rate 612 (holder.rateout). The method can then calculate and return the ratio of the consuming rate to the producing rate 614 for use by other methods, such as that shown in FIG. 5. Although FIG. 6 illustrates one method for calculating the ratio of the consuming rate to the producing rate, other methods are equally applicable and the example shown in FIG. 6 is merely shown for purposes of explanation and is not intended to be limiting.

Figure 7:
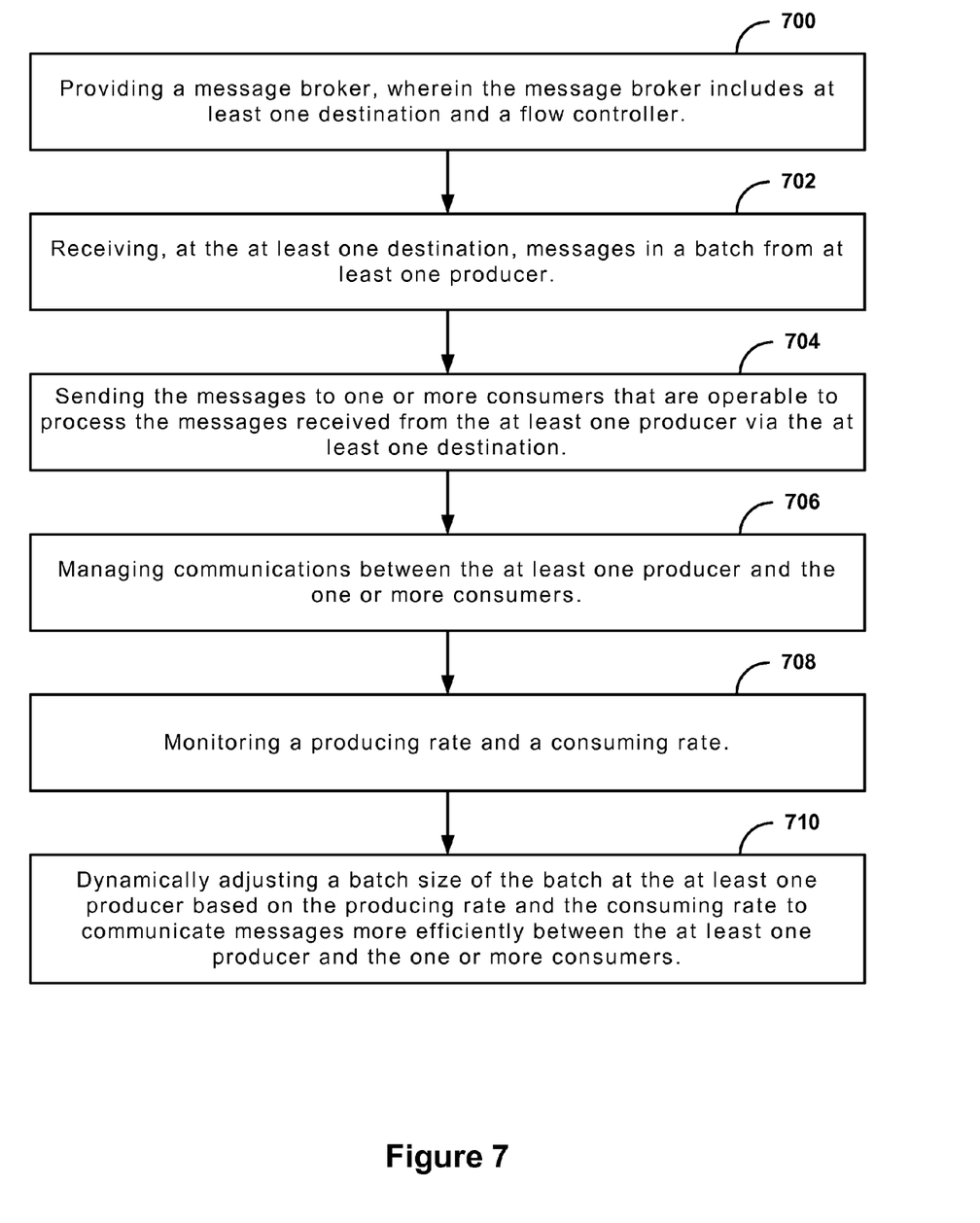
FIG. 7 shows a flowchart of a method for flow control in a messaging subsystem, in accordance with an embodiment.

FIG. 7 shows a flowchart of a method for flow control in a messaging subsystem, in accordance with an embodiment. At step 700, a message broker is provided which includes at least one destination and a flow controller. At step 702, messages are received in a batch from at least one producer at the at least one destination. At step 704, the messages are sent to one or more consumers that are operable to process the messages received from the at least one producer via the at least one destination. At step 706, communications between the at least one producer and the one or more consumers are managed. At step 708, a producing rate and a consuming rate are monitored at the message broker. At step 710, a batch size of the batch is dynamically adjusting at the at least one producer based on the producing rate and the consuming rate to communicate messages more efficiently between the at least one producer and the one or more consumers.

In accordance with an embodiment, dynamically adjusting the batch size can comprise sending an instruction to resume flow to the at least one producer from the message broker; and wherein the instruction to resume flow includes a new batch size. Additionally, the batch size at the at least one producer can be dynamically adjusted each time the instruction to resume flow is received at the at least one producer.

In accordance with an embodiment, in the method shown in FIG. 7, managing communications between the at least one producer and the one or more consumers can further comprise calculating a ratio of the consuming rate to the producing rate; and dynamically adjusting the batch size, based on the calculated ratio, to a new batch size, so that subsequent messages from the particular message producer are sent according to the new batch size. The new batch size is determined by multiplying the batch size by the calculated ratio.

The present invention can be conveniently implemented using one or more conventional general purpose or specialized digital computer, computing device, machine, or microprocessor, including one or more processors, memory and/or non-transitory computer readable storage media programmed according to the teachings of the present disclosure. Appropriate software coding can readily be prepared by skilled programmers based on the teachings of the present disclosure, as will be apparent to those skilled in the software art.

In some embodiments, the present invention includes a computer program product which is a computer readable storage medium (media) having instructions stored thereon/in which can be used to program a computer to perform any of the processes of the present invention. The computer readable storage medium can include, but is not limited to, any type of disk including floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data.

The foregoing description of the present invention has been provided for the purposes of illustration and description. It is not intended to be exhaustive or to limit the invention to the precise forms disclosed. Many modifications and variations will be apparent to the practitioner skilled in the art. The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the following claims and their equivalence.

What is claimed is:

1. A system for use in a messaging subsystem, which supports flow control of messages between one or more producer systems operable to send messages in batches having a batch size and a plurality of consumer systems operable to process said messages, the system comprising:
   a computer, including a computer readable medium and processor;
   a message broker operating on said computer;
   wherein the message broker includes at least one destination which receives said messages from said one or more producer systems at a producing rate, and from which said plurality of consumer systems consume said messages at a combined consuming rate, wherein the combined consuming rate comprises consumption of messages by all of said plurality of consumer systems in combination;
   wherein the message broker includes a flow controller configured to monitor said producing rate and said combined consuming rate and calculate a calculated ratio of said producing rate and said combined consuming rate; and
   wherein the flow controller is configured to send an adjusted batch size indication based on said calculated ratio from said flow controller to said one or more producer to dynamically adjust the batch size for batches of messages sent from said one or more producer to said at least one destination of the message broker.

2. The system of claim 1, wherein the batch size is dynamically adjusted at the at least one producer when the message broker has received an indication from one or more producer that said one or more producer systems has paused from producing messages and the message broker sends an instruction to resume flow to said at least one producer said instruction to resume flow including said adjusted batch size indication.

3. The system of claim 2, wherein the batch size at the one or more producer systems is dynamically adjusted each time the instruction to resume flow is received at the one or more producer systems.

4. The system of claim 1, wherein:
   the producing rate is determined for the at least one destination based on how many messages have been received from the one or more producer systems over a configurable time period; and
   the combined consuming rate is determined for the at least one destination based on how many messages have been consumed by all of said plurality of consumer systems in combination over the configurable time period.

5. The system of claim 4, wherein a timestamp is used to track the configurable time period.

6. The system of claim 1, wherein a new batch size is determined by multiplying the batch size by the calculated ratio.

7. A method for use in a messaging subsystem, which supports flow control of messages between one or more producer systems operable to send messages in batches having a batch size and a plurality of consumer systems, the method comprising:
   providing a message broker, executing on a computer including a computer readable medium and processor, wherein the message broker includes at least one destination and a flow controller;
   receiving, at the at least one destination, messages in a batch from the one or more producer systems at a producing rate;
   providing the messages in the at least one destination to a plurality of consumer systems that consume the messages at a combined consuming rate, wherein said plurality of consumer systems are operable to process the messages received from the one or more producer systems via the at least one destination, and wherein the combined consuming rate comprises consumption of messages by all of said plurality of consumer systems in combination;
   managing communications between the one or more producer systems and said plurality of consumer systems using the flow controller, including
      monitoring said producing rate and said combined consuming rate using the flow controller of the message broker,
      calculating a calculated ratio of said producing rate and said combined consuming rate, and
      sending an adjusted batch size indication based on said calculated ratio from said flow controller to said one or more producer systems to dynamically adjust the batch size for batches of messages sent from said one or more producer systems to said at least one destination of the message broker.

8. The method of claim 7, wherein the step of dynamically adjusting the batch size comprises:
   receiving an indication at the message broker from the one or more producer systems that said one or more producer systems has paused from producing messages; and
   sending an instruction to resume flow to the one or more producer systems from the message broker wherein the instruction to resume flow includes said adjusted batch size indication.

9. The method of claim 8, wherein the batch size at the one or more producer systems is dynamically adjusted each time the instruction to resume flow is received at the one or more producer systems.

10. The method of claim 7, wherein:
    the producing rate is determined for the at least one destination based on how many messages have been produced by the one or more producer systems over a configurable time period; and
    the combined consuming rate is determined for the at least one destination based on how many messages have been consumed by all of said plurality of consumer systems in combination over the configurable time period.

11. The method of claim 10, further comprising using a timestamp to track the configurable time period.

12. The method of claim 7, wherein the new batch size is determined by multiplying the batch size by the calculated ratio.

13. A non-transitory computer readable storage medium including instructions stored thereon for supporting flow control of messages between one or more producer systems operable to send messages in batches having a batch size and a plurality of consumer systems, which instructions, when executed by one or more computers, causes the one or more computers to perform steps comprising:
   providing a message broker, executing on a computer including a computer readable medium and processor, wherein the message broker includes at least one destination and a flow controller;
   receiving, at the at least one destination, messages from said one or more producer systems at a producing rate;
   providing the messages in the at least one destination to said plurality of consumer systems that consume the messages at a combined consuming rate, wherein the plurality of consumer systems are operable to process the messages received from the one or more producer systems via the at least one destination, and wherein the combined consuming rate comprises consumption of messages by all of said plurality of consumer systems in combination;

managing communications between the one or more producer systems and the plurality of consumer systems using the flow controller, including monitoring said producing rate and said combined consuming rate using the flow controller of the message broker, calculating a calculated ratio of said producing rate and said combined consuming rate, and sending an adjusted batch size indication based on said calculated ratio from said flow controller to said one or more producer systems to dynamically adjust the batch size for batches of messages sent from said one or more producer systems to said at least one destination of the message broker.

14. The non-transitory computer readable storage medium of claim 13, wherein the step of dynamically adjusting the batch size comprises:

receiving an indication at the message broker from the one or more producer systems that said one or more producer systems has paused from producing messages; and sending an instruction to resume flow to the one or more producer systems from the message broker wherein the instruction to resume flow includes said adjusted batch size indication.

15. The non-transitory computer readable storage medium of claim 14, wherein the batch size at the one or more producer systems is dynamically adjusted each time the instruction to resume flow is received at the one or more producer systems.

16. The non-transitory computer readable storage medium of claim 13, wherein:

the producing rate is determined for the at least one destination based on how many messages have been produced by the one or more producer systems over a configurable time period; and the combined consuming rate is determined for the at least one destination based on how many messages have been consumed by all of the plurality of consumer systems in combination over the configurable time period.

17. The non-transitory computer readable storage medium of claim 16, wherein the step further comprise using a timestamp to track the configurable time period.

18. The non-transitory computer readable storage medium of claim 13, wherein the new batch size is determined by multiplying the batch size by the calculated ratio.

19. The non-transitory computer readable storage medium of claim 13, wherein:

said receiving step comprises receiving, at the at least one destination, messages in a batch from a plurality of producer systems at a producing rate; and said managing step comprises managing communications between the plurality of producer systems and the plurality of consumer systems using the flow controller, including sending an adjusted batch size indication based on said calculated ratio from said flow controller to said plurality of producer systems to control the batch size for batches of messages sent from said plurality of producer systems to said at least one destination of the message broker.

20. The method of claim 7, wherein:

said receiving step comprises receiving, at the at least one destination, messages in a batch from a plurality of producer systems at a producing rate; and said managing step comprises managing communications between the plurality of producer systems and the plurality of consumer systems using the flow controller, including sending an adjusted batch size indication based on said calculated ratio from said flow controller to said plurality of producer systems to control the batch size for batches of messages sent from said plurality of producer systems to said at least one destination of the message broker.

* * * * *

UNITED STATES PATENT AND TRADEMARK OFFICE
CERTIFICATE OF CORRECTION

| | | |
|---|---|---|
| PATENT NO. | : 9,110,745 B2 | Page 1 of 1 |
| APPLICATION NO. | : 13/163355 | |
| DATED | : August 18, 2015 | |
| INVENTOR(S) | : Kang et al. | |

It is certified that error appears in the above-identified patent and that said Letters Patent is hereby corrected as shown below:

Specification

In column 5, lines 42-43, delete "getMsgOutRatelnRateRatio" and insert
-- getMsgOutRateInRateRatio --, therefor.

Signed and Sealed this
Thirty-first Day of May, 2016

Michelle K. Lee
*Director of the United States Patent and Trademark Office*